United States Patent Office 2,917,551
Patented Dec. 15, 1959

2,917,551

REACTION PRODUCTS OF TRIHALONITRO-
ALKENES WITH DIENES

Henry Bluestone, University Heights, Ohio, assignor to Diamond Alkali Company, Cleveland, Ohio, a corporation of Delaware No Drawing. Application June 24, 1957
Serial No. 667,692

18 Claims. (Cl. 260—644)

This invention relates to the reaction of 3,3,3-trihalo-1-nitroalkenes with conjugated dienes with the formation of carbocyclic compounds, and to a method for preparing these compounds, as well as to compositions of matter containing the same.

It has heretofore been proposed to synthesize carbocyclic compounds from straight chain carbon compounds, and more specifically it has heretofore been proposed to prepare cycloalkenes by means of the so-called "Diels-Alder" reaction, in which reaction an olefin is reacted with a conjugated diolefin. The feasibility of this reaction, as between a given mono-olefin and a conjugated diolefin, depends in part upon the substituents attached to the carbon atoms of both compounds. A mono-olefin which will react with a conjugated diolefin or with a compound which will behave as a conjugated diolefin in a Diels-Alder reaction, is referred to hereinafter as a "dienophile."

It has now been discovered that a 3,3,3-trihalo-1-nitroalkene will react as a dienophile with a conjugated diene, or a compound which behaves as a conjugated diene, in a Diels-Alder type reaction. Such dienes include butadiene, cyclopentadiene, 1,3-cyclohexadiene, and the like, as well as compounds of the aromatic series, such as anthracene, which behave as conjugated dienes in a Diels-Alder type reaction. Many other substituted or unsubstituted conjugated dienes and compounds which behave as conjugated dienes, suitable for use in this reaction will immediately suggest themselves to those skilled in the art.

Accordingly, one of the objects of the invention is the preparation of carbocyclic compounds by reaction of a 3,3,3-trihalo-1-nitroalkene with a conjugated diene, or a compound which behaves as a conjugated diene.

Another of the objects of the present invention is to provide new and useful carbocyclic compounds such as 4-trihalomethyl-5-nitrocyclohexenes, 5-trihalomethyl-6-nitrobicyclo[2.2.1]-hept-2-enes, 5-trihalomethyl-6-nitrobicyclo[2.2.2]oct-2-enes, etc.

A further object of the invention is to provide novel compositions of matter incorporating such compounds.

These and other objects of the invention will be apparent to those skilled in the art from the description of the various aspects of the invention set forth hereinbelow.

In the preparation of carbocyclic compounds using a 3,3,3-trihalo-1-nitropropene, in accordance with the present invention, the 3,3,3-trihalo-1-nitropropene undergoes the Diels-Alder reaction in the following manner, using two-dimensional structural formulas, for illustrative purposes only (the unsatisfied valences of carbon being attached to hydrogen atoms or substituent atoms or groups):

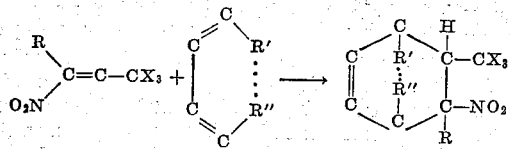

wherein X is halogen (i.e., fluorine, chlorine, bromine, or iodine) and R is selected from the group consisting of hydrogen, alkyl, aryl, alkaryl, and aralkyl radicals, in their substituted as well as their unsubstituted forms, and R' and R" collectively (as indicated by the dotted line) form a carbon bridge between the carbon atoms to which they are attached, and separately are selected from the group consisting of hydrogen atoms and alkyl radicals. Other substituent groups, not indicated may be selected from those designated for X and R.

From the above skeletal structural formula for the product of the general reaction, it will be apparent to those skilled in the art that such compounds, in addition to having other uses, are very interesting as intermediates, since three reactive groupings are provided as centers of attack for the preparation of still other compounds. Thus, the trihalomethyl group may be reduced, or may be hydrolyzed to a carboxyl group; the nitro group may be partially or entirely reduced, for example, to the nitroso or amine groups, both of which groups provide reactive centers for further reactions to form still other compounds; also, the olefinic group may be subjected to hydrogenation either separately or in conjunction with the reduction of either the nitro or trihalomethyl groups, and may be made to undergo other reactions characteristic of olefins, including the special case of rearrangements typical of such unsaturated bicyclic systems as the bicycloheptene and bicyclo-octene systems referred to above.

Of interest in this connection is the reaction of a 3,3,3-trihalo-1-nitropropene with a cyclopentadiene, or a 1,3-cyclohexadiene, in a Diels-Alder reaction, to produce a group of novel chemical compounds which are identified generically as 5-trihalomethyl-6-nitrobicyclo[2.2.1]hept-2-enes, and 5-trihalomethyl-6 - nitrobicyclo[2.2.2]oct-2-enes, respectively, the skeletal structural formulas of which are represented by the following (again, the unsatisfied valences of carbon are considered as attached to hydrogen atoms or to substituent atoms or groups):

and

wherein X is halogen and R is selected from the group consisting of hydrogen, alkyl, aryl, alkaryl, and aralkyl radicals, and their substituted forms (the —C— and —C—C— forming the central bridge groups, represent the specific case where —R'...R"— is considered collectively); other substituent atoms or groups, not indicated, may be selected from those designated for X and R.

Compounds of this group are active biological toxicants, and are useful as intermediates for compounds which may be prepared by reaction with elements or compounds which attack the double bond of the bicycloheptene, or bicyclo-octene, or will react with the substituent groups —$NO_2$ and —$CX_3$. For example, these compounds may be reacted with halogen to form halogen addition products, or with hydrogen peroxide, or per-acids, to form the epoxides or glycols, or with hydrogen to form the corresponding bicycloheptane, or bicyclo-octane, or with phenylazide to form the corresponding phenyltriazole derivative of the bicycloheptane. Also, the nitro group may be reduced to any of the several possibilities well-known in the art, and the trihalomethyl group may be reduced or hydrolyzed.

In the preparation of 5-trihalomethyl-6-nitrobicyclo[2.2.1]-hept-2-enes of the present invention, the skeletal structural formula for which is shown hereinabove, it is suitable first to prepare the appropriate 3,3,3-trihalo-1-nitro-2-alkanol by the reaction of a trihalogen substituted acetaldehyde in accordance with the following reaction:

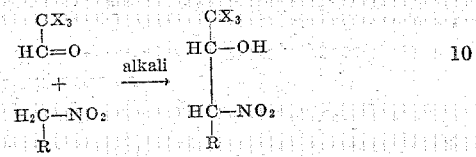

wherein X is halogen and R is selected from the group consisting of hydrogen, alkyl, aryl, aralkyl, and alkaryl radicals.

The resulting 3,3,3-trihalo-1-nitro-2-alkanol may then be treated so as to produce the corresponding 3,3,3-trihalo-1-nitroalkene having the following general formula:

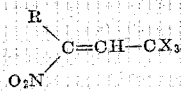

wherein X and R are as above.

Such treatment of the secondary alcohol, obtained in the above reaction, includes dehydration with a suitable dehydrating agent, such as phosphorus pentoxide, or esterification followed by the simultaneous hydrolysis and dehydration to form the olefin.

The synthesis of the class of novel compounds to which the present invention is directed, is readily illustrated by the preparation of 5-trichloromethyl-6-nitrobicyclo[2.2.1]hept-2-ene. In the preparation of this compound, it is expedient first to prepare 3,3,3-trichloro-1-nitro-2-propanol by the reaction of chloral hydrate with nitromethane in an aqueous alkaline solution. The 3,3,3-trichloro-1-nitro-2-propanol may then be dehydrated with phosphorous pentoxide to produce 3,3,3-trichloro-1-nitropropene.

The 3,3,3-trichloro-1-nitropropene readily reacts with cyclopentadiene exothermically, to produce one of the novel compounds of the present invention, 5-trichloromethyl-6-nitro-bicyclo[2.2.1]hept-2-ene, which has the following structural formula:

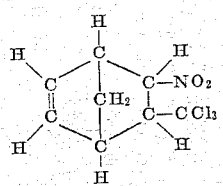

Typical of a compound of the aromatic series which behaves as a conjugated diene in the method of the present invention is anthracene. Its reaction product with a compound of the formula:

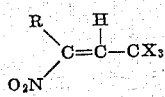

wherein R and X are as above, is illustrated by reaction with 3,3,3-trichloro-1-nitropropene wherein the compound of structural formula

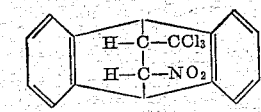

is formed. This compound is designated 11-nitro-12-trichloromethyl-9,10-ethano-9,10-dihydroanthracene, and although this cis-isomer is shown, the trans-isomer is also formed.

It is to be noted specifically that in this compound, grouping

is considered, for the purposes of the present invention, as the equivalent of the

grouping of the general formula given hereinabove.

Other exemplary halo-nitro compounds, represented by the formula:

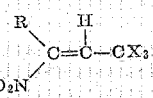

wherein R and X are as noted hereinabove, which may be used as dienophiles in accordance with the present invention, are the following, which are designated as derivatives of propene:

(1) When R is alkyl—
  3,3,3-tribromo-1-nitro-1-methylpropene
  3-bromo-3,3-dichloro-1-nitro-1-propylpropene
  3,3,3-trifluoro-1-nitro-1-butylpropene
  3-chloro-3,3-difluoro-1-nitro-1-ethylpropene
(2) When R is aryl—
  3,3,3-trichloro-1-nitro-1-phenylpropene
  3,3,3-trichloro-1-nitro-1-(2-chlorophenyl)-propene
  3,3,3 - trichloro - 1 - nitro - 1 - (2,4 - dichlorophenyl)-propene
(3) When R is alkaryl—
  3,3,3 - trichloro - 1 - nitro - 1 - (4 - t - butylphenyl)-propene
  3,3,3 - trichloro - 1 - nitro - 1 - (2,4 - dimethylphenyl)-propene
  3,3,3 - trichloro - 1 - nitro - 1 - (4 - methoxy - 3-methylphenyl)-propene
(4) When R is aralkyl—
  3,3,3-trichloro-1-nitro-1-benzylpropene
  3,3,3-trichloro-1-nitro-1-(2-phenylethyl)-propene These compounds may be reacted with conjugated dienes, or compounds which behave as conjugated dienes, by addition to the double bond, to form additional novel and useful compounds.

In order that those skilled in the art may better understand the present invention, the method of preparing the new and useful compounds which are the subject hereof, and the method of using the same, the following specific examples are offered, by way of illustration:

*Example 1*

Using the method of Chattaway and Witherington, described in the Journal of the Chemical Society (London), 1935, pp. 1178–79, for the preparation of 3,3,3-trichloro-1-nitro-2-propanol, 590 grams of chloral hydrate is combined, in a 2-liter, 3-necked flask, with 100 grams of sodium sulfite dissolved in 800 ml. of water. The flask is equipped with a stirrer, thermometer, and reflux condenser. Nitromethane in the amount of 244 grams is then added to this mixture. The mixture of reactants is heated and when it becomes turbid, agitation is stopped, and the mixture is then heated to 70° C. The reaction mixture is maintained at this temperature for a period of about 5 minutes after which it separates into two layers. The aqueous layer is discarded and the non-aqueous phase is washed once with 200 ml. of water and then dried with anhydrous magnesium sulfate. This organic phase, amounting to about 500 ml. in volume, is concentrated at about 50° C. at 20 mm. pressure (obtainable with a water aspirator) until most of the unreacted materials are removed. The remainder of the reaction product is then distilled at a pressure of 3 mm. at a temperature of 115°–120° C. The yield is 586 grams or 70.5% of theory for 3,3,3-trichloro-1-nitro-2-propanol.

The 3,3,3-trichloro-1-nitropropanol is dehydrated to 3,3,3-trichloro-1-nitropropene by using phosphorus pentoxide as the dehydrating agent and heating a mixture of the two reactants to distill off the product at reduced pressure, following a procedure similar to that described by Irving and Fuller in the Journal of the Chemical Society (London), 1948, page 1989.

56.5 grams of the 3,3,3-trichloro-1-nitropropene and 38 ml. of benzene are placed in a 3-necked 500 ml. flask equipped with a stirrer and dropping funnel, together with a reflux condenser and thermometer. 58 ml. of freshly distilled cyclopentadiene is added to the flask through the dropping funnel; the reaction is exothermic and cooling is required to keep the temperature at about 70° C. for a period of about 45 minutes. The reaction mixture is then refluxed for a period of 2 hours, and finally the benzene is stripped off at the pressure of a water aspirator. The excess discyclopentadiene is then distilled off at water pump pressure. The liquid remaining in the flask is distilled at about 90° C. and 0.5 mm. pressure, the temperature and pressure rising during the distillation to about 110° C. and 1.3 mm., respectively. This product is redistilled to give a clear colorless liquid boiling at 100°–102° C. at 0.1 mm. and having a refractive index of 1.5344 at 23° C. The product is anlyzed for carbon, hydrogen, and chlorine, with the following results:

|  | Found for Product |  | Theoretical for $C_8H_8Cl_3NO_2$ |
|---|---|---|---|
| Percent Carbon | 36.8 | 37.1 | 37.4 |
| Percent Hydrogen | 3.04 | 3.17 | 3.12 |
| Percent Chlorine | 41.3 | 41.6 | 41.5 |

Considering that the 3,3,3-trichloro-1-nitropropene reacted with the cyclopentadiene to produce a 1:1 addition product, a Diels-Alder type reaction is seen to be involved. In this instance, a bicycloheptene derivative would result; specifically the compound 5-trichloromethyl - 6 - nitrobicyclo[2.2.1]hept-2-ene, the structural formula for which is:

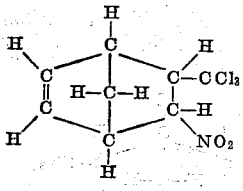

The product obtained reacts readily with phenylazide (specific for [2.2.1]bicyclohept-2-enes), with hydrogen peroxide or per-acids to form an epoxy compound, and catalytically, with hydrogen, each indicative of an olefin linkage. Hence, the proposed structure above would appear to be valid.

*Example II*

The product obtained in Example I, identified as 5-trichloromethyl - 6-nitrobicyclo[2.2.1]hept-2-ene, is dissolved in acetone to form a 1% solution. 2 ml. of this solution is applied to a filter paper (125 mm. diameter) and allowed to air dry. Adult houseflies are then caged within hemispherical cages, over the treated filter papers. Mortality is observed at the end of 8 hours following the initial exposure, and it is found that there is 100% mortality within this period of time.

A further 2 ml. portion of the 1% acetone solution identified in the fore part of this example, is applied to a filter paper (125 mm. in diameter) and the solution allowed to air dry. Adult houseflies, 3 to 5 days old, are caged over the treated filter papers. Five replicates are used. It is observed that after 2½ hours there are 41% of "down flies" (dead or immobilized) and 100% of "down flies" after 5 hours.

Thus, a strong insecticidal fumigant action is indicated for this compound.

*Example III*

38.1 grams of 3,3,3-trichloro-1-nitropropene is placed in a heavy-walled, Pyrex, glass tube (sealed at one end) and chilled in an acetone-Dry Ice mixture. 20 ml. of chilled liquid butadiene is added, and the tube is sealed. The tube is removed from the acetone-Dry Ice bath and allowed to warm up to room temperature. The tube is heated at 85° to 95° C. for 14 hours, cooled in an acetone-Dry Ice bath, and opened. The tube is again removed from the cooling bath and allowed to warm up to room temperature slowly; during this time the excess butadiene boils away. The liquid remaining in the tube is distilled and the material which distills at 94° C. and 0.8 mm. pressure to 98° C. and 1.0 mm. pressure is collected and analyzed for nitrogen, with the following results:

|  | Found for Product |  | Theoretical for $C_7H_8Cl_3NO_2$ |
|---|---|---|---|
| Percent Nitrogen | 5.82 | 5.96 | 5.73 |

Considering that there was a reaction of the 3,3,3-trichloromethyl-1-nitropropene with the butadiene, a 1:1 addition product would be formed, and a Diels-Alder type reaction is seen to be involved. In this instance, a cyclohexene derivative would result; specifically the compound 4-trichloromethyl-5-nitrocyclohexene, the structural formula for which is

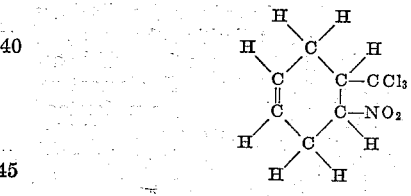

*Example IV*

19.5 grams of 3,3,3-trichloro-1-nitropropene is placed in a 100 ml. flask fitted with a reflux condenser. 8.2 grams of 2,3-dimethylbutadiene is added and the mixture is allowed to stand for one hour; during this time the mixture becomes hot. The hot solution is heated to reflux and gentle boiling is maintained for three hours. The liquid is distilled, yielding, at 120°–122° C. and 1.0 mm. pressure, a liquid, $n_D^{26}$ 1.5223, which is analyzed for carbon, hydrogen, and nitrogen with the following results:

|  | Found for Product |  | Theoretical for $C_9H_{12}Cl_3NO_2$ |
|---|---|---|---|
| Percent Carbon | 39.81 | 40.09 | 39.7 |
| Percent Hydrogen | 4.54 | 4.47 | 4.44 |
| Percent Nitrogen | 5.08 | 5.24 | 5.13 |

Again, considering that a reaction product of the 3,3,3-trichloromethyl-1-nitropropene and 2,3-dimethyl-1,3-butadiene was formed, a 1:1 Diels-Alder addition product would result having the structural formula:

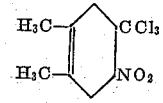

which is designated 1,2-dimethyl-4-nitro-5-trichloromethylcyclohexene.

Example V 9.5 grams of 3,3,3-trichloro-1-nitropropene is added to a 100 ml. flask containing 8.9 grams of anthracene and 50 ml. of toluene. The flask is fitted with a reflux condenser and heated at the reflux temperature for 19 hours. On cooling the reaction mixture, unreacted anthracene precipitates and is removed by filtration. The filtrate is concentrated by evaporation of toluene at about 20 mm. pressure, yielding a viscous oil. Stirring this oil in isopropyl alcohol produced a crystalline solid which was recrystallized twice from isopropyl alcohol to produce a solid of melting point 95.5°–96.5° C. Analysis of a sample for carbon, hydrogen, chlorine, and nitrogen gives the following results:

|  | Found for Product |  | Theoretical for $C_{17}H_{12}Cl_3NO_2$ |
|---|---|---|---|
| Percent Carbon | 55.16 | 55.03 | 55.4 |
| Percent Hydrogen | 3.27 | 3.41 | 3.28 |
| Percent Chlorine | 28.4 | 28.8 | 28.83 |
| Percent Nitrogen | 3.96 | 3.87 | 3.80 |

Again considering that a reaction product of anthracene and 3,3,3-trichloromethyl-1-nitropropene was obtained, a Diels-Alder reaction would be expected. The analytical data are in good agreement for a 1:1 Diels-Alder addition product having the structural formula:

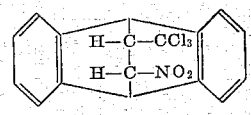

which is designated 11-nitro-12-trichloromethyl-9,10-ethano-9,10-dihydroanthracene.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method which includes the steps of reacting a compound represented by the formula:

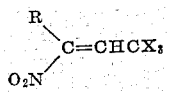

wherein X is halogen and R is selected from the group consisting of hydrogen, alkyl, aryl, aralkyl, and alkaryl radicals, with a compound which behaves as a conjugated diene, and recovering a trihalo-, nitro-, substituted cyclic olefin from the reaction product.

2. The method of claim 1 wherein R of said formula is alkyl.
3. The method of claim 1 wherein R of said formula is aryl.
4. The method of claim 1 wherein R of said formula is alkaryl.
5. The method of claim 1 wherein R of said formula is aralkyl.
6. The method of claim 1 wherein R of said formula is hydrogen.
7. The method of claim 6 wherein X is chlorine.
8. The method of claim 6 wherein the conjugated diene is cyclopentadiene.

9. A compound of the general formula:

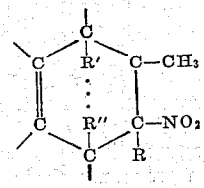

wherein X is halogen, R is selected from the group consisting of hydrogen, alkyl, aryl, alkaryl, and aralkyl radicals, and R′ and R″ are selected from the group consisting of hydrogen atoms and an alkylene group forming a bridge between the carbon atoms to which R′ and R″ are attached, the remaining bonds being satisfied by substances selected from the group consisting of X and R as defined herein.

10. The method which includes the steps of reacting a compound of the formula:

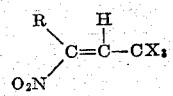

wherein X is halogen and R is selected from the group consisting of hydrogen, and alkyl, aryl, alkaryl, and aralkyl radicals with a compound which behaves as a conjugated cyclic diene, and recovering a trihalo-, nitro-, substituted bicyclic olefinic compound from the reaction product.

11. A compound defined by the structural formula:

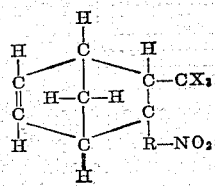

wherein X is halogen and R is selected from the group consisting of hydrogen, alkyl, aryl, aralkyl, and alkaryl radicals.

12. The method of making a 5-trihalomethyl-6-nitro-bicyclo[2.2.1]hept-2-ene having the following structural formula:

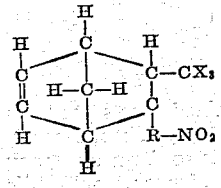

wherein X is halogen, and R is selected from the group consisting of hydrogen, alkyl, aryl, aralkyl, and alkaryl radicals, which includes the steps of reacting a compound of the structural formula:

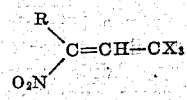

wherein X is halogen and R is selected from the group consisting of hydrogen, alkyl, aryl, aralkyl, and alkaryl radicals, with cyclopentadiene.

13. The method of claim 12 wherein R of said formula is hydrogen and X of said formula is chlorine.

14. The compound 5-trichloromethyl-6-nitro-bicyclo-[2.2.1]hep-2-ene having the following structural formula:

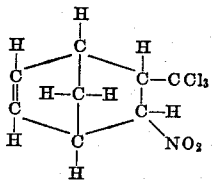

15. The method which includes the steps of reacting 3,3,3-trichloromethyl-1-nitropropene with a conjugated diene.
16. 1,2-dimethyl-4-trichloromethyl-5-nitro-cyclohexene.
17. 11-nitro-12-trichloromethyl - 9,10-ethano-9,10-dihydroanthracene.
18. 4-trichloromethyl-5-nitrocyclohexene.

References Cited in the file of this patent

Klager: "J. of Org. Chem.," 20, 650–656, May 1955.

UNITED STATES PATENT OFFICE
CERTIFICATE OF CORRECTION

Patent No. 2,917,551                                                December 15, 1959

Henry Bluestone

It is hereby certified that error appears in the printed specification of the above numbered patent requiring correction and that the said Letters Patent should read as corrected below.

Column 5, line 23, for "discyclopentadiene" read —dicyclopentadiene—; column 8, line 5, claim 9, for the upper right-hand portion of the formula reading "C—CH$_3$" read — C—CX$_3$ —.

Signed and sealed this 24th day of May 1960.

(SEAL)
Attest:

KARL H. AXLINE
Attesting Officer

ROBERT C. WATSON
Commissioner of Patents